United States Patent [19]

LaSota

[11] Patent Number: 5,055,725

[45] Date of Patent: Oct. 8, 1991

[54] LINEAR MOTOR

[76] Inventor: Laurence LaSota, 15745 N. Park, East Detroit, Mich. 48021

[21] Appl. No.: 435,564

[22] Filed: Nov. 13, 1989

[51] Int. Cl.⁵ ............................................ H02K 41/00
[52] U.S. Cl. ....................................... 310/14; 310/23; 310/12; 335/253
[58] Field of Search ....................... 310/12, 13, 14, 15, 310/16, 17, 18, 19, 20, 23; 318/135; 335/253, 254, 255, 77

[56] References Cited

U.S. PATENT DOCUMENTS

| | | | |
|---|---|---|---|
| 887,344 | 5/1908 | Nelson | 188/65.1 |
| 2,935,663 | 5/1960 | Pollak | 317/190 |
| 3,219,854 | 11/1965 | McLaughlin | 310/14 |
| 3,275,964 | 9/1966 | Kumm | 335/259 |
| 3,344,377 | 9/1967 | Clements | 335/259 |
| 3,430,120 | 2/1969 | Kotaka et al. | 318/135 |
| 3,455,688 | 5/1969 | Thorel et al. | 310/14 |
| 3,491,319 | 1/1970 | Cox et al. | 335/259 |
| 3,495,147 | 2/1970 | Flora | 310/135 |
| 3,713,059 | 1/1973 | Tada | 335/259 |
| 3,763,412 | 10/1973 | Detrick et al. | 318/135 |
| 3,825,160 | 7/1974 | Lichtenberger et al. | 226/59 |
| 3,895,281 | 7/1975 | Corbaz | 318/687 |
| 4,242,606 | 12/1980 | Nonnenmann | 310/12 |
| 4,327,344 | 4/1982 | Lukenbach | 335/253 |
| 4,352,048 | 9/1982 | Schulze | 318/135 |
| 4,358,691 | 11/1982 | Naylor | 310/12 |
| 4,460,811 | 2/1987 | Peletan | 376/228 |
| 4,835,425 | 5/1989 | LaSota | 310/14 |

Primary Examiner—Steven L. Stephan
Assistant Examiner—Judson H. Jones
Attorney, Agent, or Firm—Basile and Hanlon

[57] ABSTRACT

A linear motor provides stepwise, incremental advance of a movable member. A linear motor includes an electric coil surrounded by a magnetic core. A co-axially aligned magnetic movable pole member and a magnetic plunger extend through the core and coil. Opposed faces of the movable pole member and the plunger are separated by an air gap. A biasing spring is connected between the plunger and the pole member to bias the pole member away from the plunger when electric current has been removed from the coil to re-establish the air gap between the pole member and the plunger. Latches act on the pole member and the plunger to provide unidirectional movement of the pole member and plunger when a magnetic field induced in the core when current is applied to the coil causes advance of the plunger into contact with the pole member. When current is removed from the coil, the magnetic field collapses and the biasing spring urges the pole member away from the plunger to re-establish the air gap for the next sequential energization of the coil. A latch release device is provided to release the latches and enable the pole member and the plunger to be retracted to a start position. In one embodiment, pairs of latches are associated in an opposite orientation with each of the pole member and the plunger. A latch control mechanism switches the latches between positions to provide bi-directional, incremental advance over the pole member and the plunger in opposite directions.

16 Claims, 5 Drawing Sheets

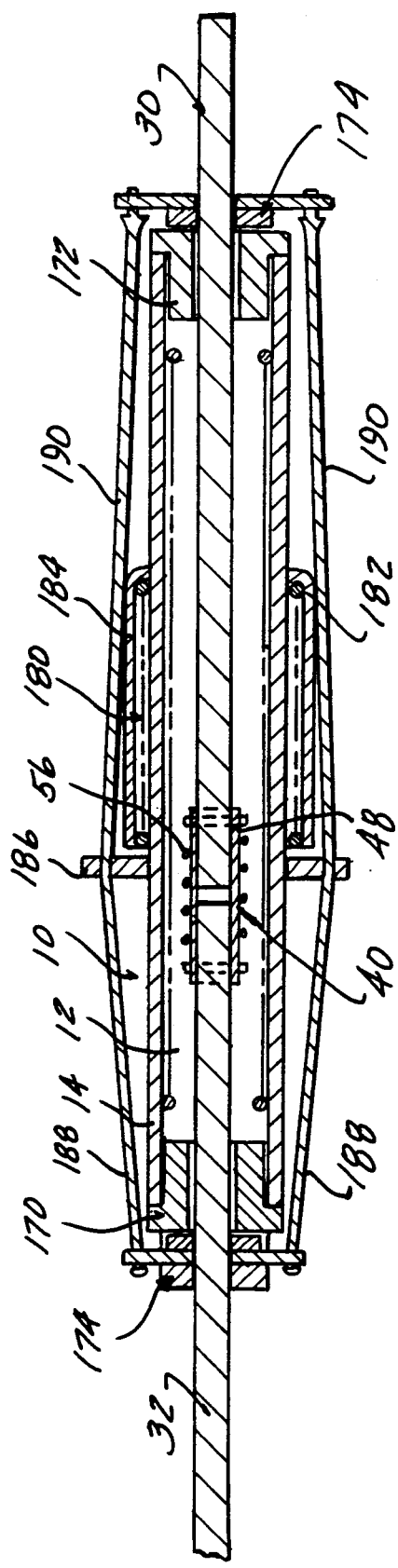
FIG-10
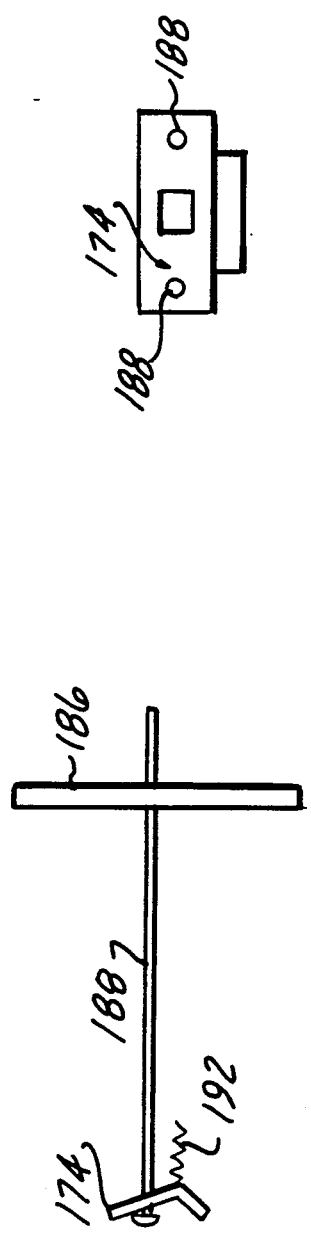
FIG-11
FIG-12

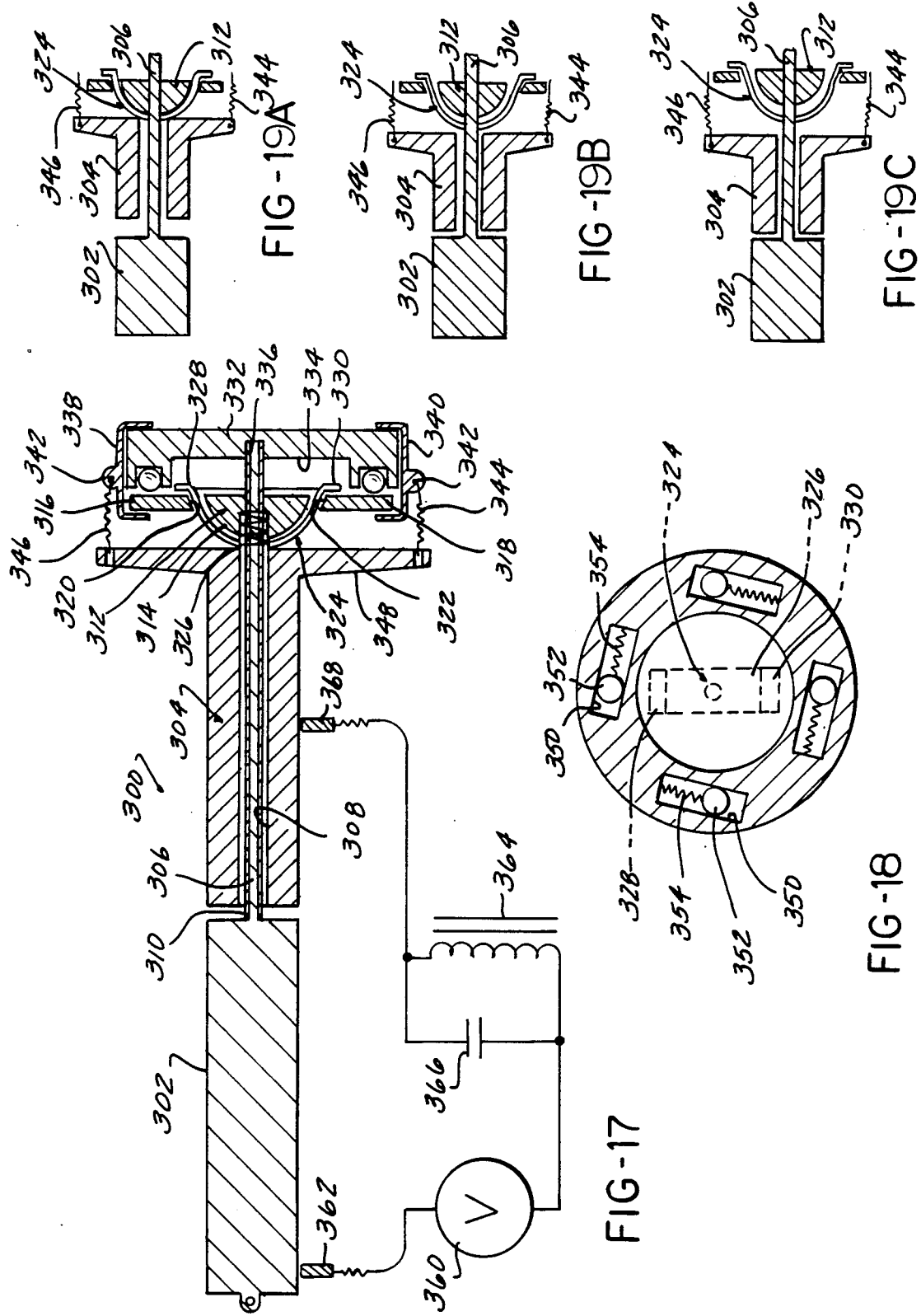

LINEAR MOTOR

BACKGROUND OF THE INVENTION

1. Field of the Invention

The present invention relates, in general, to electromagnetic actuating devices and, specifically, to linear positioning devices utilizing electromagnetic actuating means to control the incremental advance of a movable member.

2. Description of the Relevant Art

Electromagnetic actuating devices have been employed to incrementally advance a magnetic member upon repeated energization of the device. Such devices utilize an electrical coil and a magnetic core including at least one movable core member which is attracted to another portion of the core by the magnetic flux induced in the core when electric current is applied to the coil.

Numerous configurations for electromagnetic actuating devices have been devised for different applications and some include a plurality of coils and movable cores for variable, discrete advance of a movable core depending upon the magnitude of the current applied to the coils or the numbers of coils which are energized. Other incremental positioning devices simply operate in an on/off mode, that is, the movable member moves to one position when the coil is energized and then returns to the start position when current is removed from the electric coil.

Spring biasing means have also been employed to reset the movable core to its start position spaced from the other core portion when the electric current is removed from the coil. Pawl and latch devices have been employed in such linear actuators to hold the movable member in a stationary advanced position after current has been removed from the coil.

U.S. Pat. No. 4,835,425, issued to the same inventor as the subject invention, discloses a novel linear motor which incrementally advances a movable member or workpiece in a stepwise fashion upon each repeated, successive energization of the motor. The linear motor disclosed in U.S. Pat. No. 4,835,425 utilizes latches in the form of a pair of cams associated with the plunger and the pole member of the motor which latch the plunger and the pole member in each incremental advanced position after each successive energization of the electric coil.

While the linear motor disclosed in U.S. Pat. No. 4,835,425 provides a unique approach to incremental advance of a movable member, it has been found that certain improvements could be made to this linear motor in the areas of size, manufacturing cost and to simplify its construction and operation. It would also be desirable to provide such a linear motor with means for selectively releasing the latch means so as to enable the pole member and the plunger and the connected movable member or workpiece to be retracted to a home or start position.

SUMMARY OF THE INVENTION

The present invention is a linear motor which provides stepwise, incremental advance of a movable member and a workpiece attached thereto. The linear motor comprises an electric coil surrounded by an outer magnetic core. A magnetic, movable pole member and a magnetic movable plunger are slidably disposed through and extend outward from opposite ends of the outer magnetic core and the coil. The magnetic movable pole member and the magnetic movable plunger are co-axially aligned and normally separated by an air gap.

The magnetic core, the pole member and the plunger form a magnetic flux path which causes the plunger to be attracted into contact with the pole member closing the air gap between the plunger and the pole member when electric current is applied to the coil.

Biasing means are connected between the plunger and the pole member for biasing the pole member away from the plunger to re-establish the air gap between the pole member and the plunger when electric current is discontinued from the coil.

Unidirectional latch means are associated with and act on each of the pole member and the plunger to provide unidirectional movement of the pole member and the plunger upon each successive energization of the coil. The latch means may be provided in any one of several embodiments. In one embodiment, the latch means comprises a pair of plates pivotably mounted with respect to the ends of the magnetic core. Each of the plates has a centrally located aperture formed through which the pole member and the plunger respectively extends. When the plates are pivoted in one position, the periphery of each plate surrounding the central aperture engages the pole member and the plunger thereby allowing movement of the pole member and the plunger in only one direction; but preventing movement of the pole member and the plunger in a reverse, opposed direction.

In another embodiment, the latch means comprises a pair of latches associated with each of the pole member and plunger. Each pair of latches comprises a pair of wedge members having a first flat surface and a second flat surface inclined at an angle with respect to the first surface. A pair of posts are connected to the end of the magnetic core and one engages the inclined surface on each wedge member. Biasing means urge each wedge member into a wedging position with respect to associated pole member and plunger preventing movement of the pole member and the plunger in one direction. Axial movement of the pole member and plunger in an opposite direction overcomes the biasing force to release the wedge members and enables unidirectional movement in an opposed direction only.

In yet another embodiment, a pair of latches is associated with each of the pole members and the plunger. Each pair of latches comprises latch members in a form of eccentric cams. Biasing means act on each of the cams to bias the cams to a first position preventing movement of the associated pole member and plunger in one direction. Movement of the pole member and the plunger in an opposite direction overcomes the biasing force and rotates the cams to permit unidirectional advance of the pole member and the plunger. In yet another embodiment of the latch means, first and second angularly disposed planar ramp surfaces extend outward from each end of the magnetic core. A roller is disposed in contact with each ramp surface and acts on the associated pole member or plunger. Biasing means urges each roller to a first position in which the roller is wedged between the ramp and the associated pole member or plunger to prevent movement of the pole member and plunger in one direction. Axial movement of the pole member and the plunger in an opposite direction forces the roller outward along the ramp to permit unidirectional movement of the pole member and the plunger.

In another embodiment of the latch means, each of the pole member and the plunger has at least a portion formed with a plurality of angularly shaped teeth. Pairs of first and second pawls are associated with each of the pole member and the plunger. Means are provided for urging each pawl into engagement with the angular teeth in the associated pole member and plunger to allow one direction movement of the associated pole member or plunger; but preventing reverse movement in an opposite direction. Finally, the latch means may comprise a pair of sprags associated with each of the pole member or the plunger. Each sprag includes opposed notches formed in an end cap mounted on the end of the magnetic core. A pair of links engages the pole member and plunger at one end and the notches at the other. Means are provided for biasing the links of the sprags into a first position which prevents movement of the pole member and the plunger; but allows reverse, opposed movement of the pole member and the plunger.

The linear motor of the present invention also includes latch release means for releasing the latch means to enable the pole member and the plunger to be retracted to a home or start position. The latch release means is also provided in several configurations, each useable with any one of the latch means described above. In one embodiment, the latch release means includes first and second non-ferrous end caps mounted in opposed ends of the magnetic core. First and second permanent magnets of opposite polarity are slidably disposed in opposite ends of the magnetic core inward of the first and second end caps, respectively, and form a part of the magnetic circuit with the magnetic core. The pole member and the plunger slidably extend through the first and second end caps and the first and second permanent magnets. At least one pin is connected to each of the first and second permanent magnets and acts on the unidirectional latch means associated with the pole member and the plunger. When electric current of one polarity is applied to the magnetic coil, the first permanent magnet is repelled and slides outward toward the first end cap while the second magnet is attracted to the coil and slides inward to move the latch means to a position allowing movement of the pole member and plunger in an opposite direction from the incremental advance direction.

In another embodiment, the latch release means comprises a coaxial solenoid formed of a magnetic core and coil disposed concentrically about the magnetic coil and core of the linear motor. A plunger is associated with outer magnetic core and is slidably mounted on the magnetic core of the linear motor. At least one and preferably two latch release rods are connected to the plunger at one end and to the unidirectional latch means of the pole member and the plunger at opposite ends. The plunger is attracted to the magnetic core when current is applied to the coil and moves the unidirectional latch release means through the latch release rods to a position allowing retractive movement of the pole member and the plunger.

And yet another embodiment, the latch release means comprises first and second end caps fixedly mounted on opposite ends of the magnetic core and forming a part of the magnetic flux circuit of the magnetic core. The pole member and the plunger slidably extend through the first and second end caps, respectively. A rod formed of a shape memory material is connected between the magnetic core and the unidirectional latch means associated with the pole member and the plunger. The rod contracts when heated to cause switching of the latch means to a position allowing retraction of the pole member and plunger in a direction opposite to the incremental advance direction of movement of the pole member and the plunger.

The linear motor may also be constructed for bidirectional operation by utilizing any of the latches described above in opposed pairs for the pole member and the plunger. The latch members in each pair of latches are disposed in opposed orientations such that one latch in each pair prevents movement of the associated pole member or plunger in one direction; but allows movement in an opposed direction; while the other latch in each pair of latches provides blocking and movement allowing operation of the pole member and the plunger in an opposed direction. Latch control means driven by any one of the latch release means described above is coupled to each pair of latches for controlling the position of the latches for selecting bidirectional operation of the linear motor.

In another embodiment, the linear motor includes first and second magnetic movable members, each operable as a pole member or a plunger. A guide rod is connected at one end to one of the movable members and slidably extends through the other movable member to a fixed connection with a rotator body. A contact body is rotatably mounted in the rotator body and carries an electrical contact initially disposed in contact with the second magnetic movable member and electrically connected between an electrical power source and the magnetic coil. Biasing means extend between the second magnetic movable member and the rotator body to bring the rotator body and the contact mounted in the contact body connected thereto back into contact with the first magnetic movable member. Means are mounted in the rotator member for rotating the contact after each operation of the linear motor.

The linear motor of the present invention has a simple construction and a small, compact shape. The linear motor can be constructed for unidirectional and bidirectional modes of operations and with different types of latches and latch release means to meet the requirements of a large number of different applications. The latch release means employed on the linear motor of the present invention also provides an expedient means for retracting the pole member and plunger to a start position after the pole member and plunger have reached the end of their incremental advance.

BRIEF DESCRIPTION OF THE DRAWINGS

The various features, advantages and other uses of the present invention will become more apparent by referring to the following detailed description and drawing in which:

FIG. 10 is a plan, cross-sectional view of another embodiment of the linear motor showing a coaxial solenoid latch release means;

FIG. 11 is a end view of the aperture plate latch shown in FIG. 10;

FIG. 12 is a partial, side elevational view of the latch release means shown in FIG. 10;

FIG. 17 is a partial, side cross-sectional view of an automatic switching embodiment of the linear motor;

FIG. 18 is a cross-sectional view generally taken along line 18—18 in FIG. 17; and FIGS. 19A, 19B and 19C are partial, plan, elevational views showing the sequential positions of the components of the linear motor shown in FIG. 17 through one incremental advance step.

DESCRIPTION OF THE PREFERRED EMBODIMENT

Figure 1:
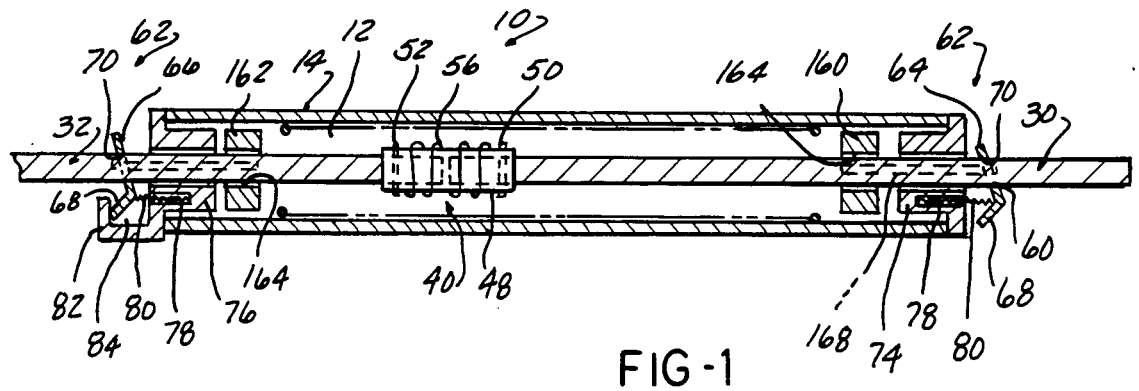
FIG. 1 is a plan cross-sectional view of one embodiment of the linear motor of the present invention having permanent magnet latch release means mounted thereon.

Throughout the following description and drawing an identical reference number is used to refer to the same component shown in multiple figures of the drawing.

FIG. 1 depicts one embodiment of the linear motor 10 constructed in accordance with the teachings of the present invention. The linear motor 10 includes an electric coil 12 and an outer magnetic core 14. The electric coil 12 is formed of a plurality of turns or windings of an electrical conductor. The windings form a central aperture, such as when wound around a bobbin, not shown. A coil support tube, also not shown, may be provided to provide sideways support for the windings of the coil 12. Leads, not shown, are connected to the ends of the windings of the coil 12 to supply electric current thereto.

The magnetic core 14 is formed of a suitable magnetic material, such as iron or other ferrous materials. The magnetic core 14 may be formed of a plurality of thin laminations of magnetic mateial or a solid layer of magnetic material.

The coil 12 and the magnetic core 14 have a generally elongated, tubular shape with a circular or other cross-section.

The magnetic circuit of the linear motor 10 also includes a movable pole member 30 and a movable plunger 32. Both the pole member 30 and the plunger 32 are formed of magnetic material and have a substantially square cross-section so as to be slidably disposed within the coil 12 and magnetic core 14 and to extend outward from opposite ends of the coil 12 and the core 14 as shown in FIG. 1.

Means denoted in general by reference number 40 is provided for establishing an air gap between opposed, facing end surfaces 42 and 44 of the pole member 30 and the plunger 32, respectively. In a preferred embodiment, as shown in FIG. 1 and FIGS. 2A, 2B and 2C, a limit sleeve 48 having a generally tubular shape is disposed about the opposed, facing ends 42 and 44 of the pole member 30 and the plunger 32. First and second pins 50 and 52 extend through opposed ends of the tubular sleeve 48 and the pole member 30 and the plunger 32, respectively, as shown in detail in FIG. 2A. An elongated slot 54 is formed in one end of the tubular sleeve 48 and receives the pin 50, which extends through the pole member 30. The length of the slot 54 corresponds to the length of the air gap 46 and assists in reestablishing the air gap 46 when electric current has been discontinued to the coil 12, as described hereafter.

The length of the air gap 46 is selected to provide the desired amount of incremental advance of the linear motor 10. The air gap 46 is established by the magnetic materials and the dimensions of the coil 12, the core 14, the pole member 30 and the plunger 32.

Biasing means 56, preferably in the form of a coil spring, is provided for biasing the pole member 30 away from the plunger 32 to re-establish the air gap 46 after electric current has been discontinued from the coil 12. The coil spring 56 is attached at opposite ends to the pins 50 and 52 extending through the tubular sleeve 48 and is disposed about the exterior of the tubular sleeve 48.

Figure 2A:
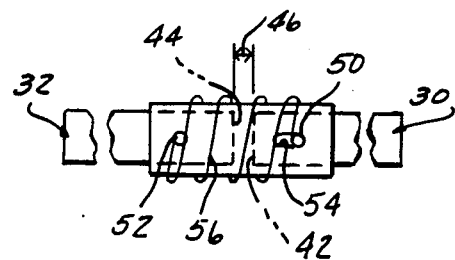
FIGS. 2A, 2B and 2C are enlarged, partial, side elevational views showing the position of the pole member, the plunger and the biasing means during one incremental advance of the pole member and the plunger.

The operation of the linear motor 10 will now be described in conjunction with FIGS. 2A, 2B and 2C. In FIG. 2A, the components of the linear motor 10, namely, the pole member 30 and the plunger 32, are shown in their normal, de-energized spaced apart position. In this position, the opposed faces 42 and 44 of the pole member 30 and the plunger 32 are spaced apart by the air gap 46. The biasing spring 56 is extended between the pins 50 and 52.

Figure 2B:
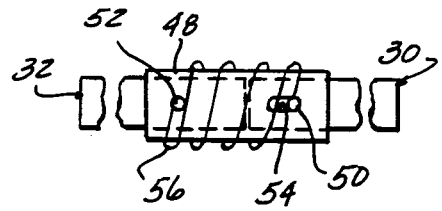
Figure 2C:
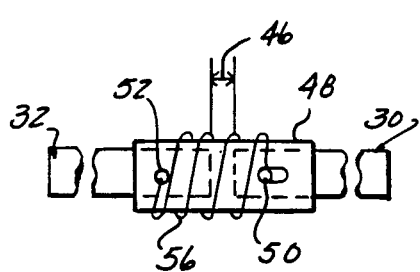

Upon energization, through the application of electric current to the coil 12, magnetic flux is induced in the magnetic core 14 which attracts the plunger 32 toward the pole member 30 until the face 44 of the plunger 32 contacts the opposed face 42 of the pole member 30, as shown in FIG. 2B. The magnetic flux holds the pole member 30 in the start position shown in FIGS. 2A and 2B. The movement of the plunger 32 toward the pole member 30 closes the air gap 46 and compresses the spring 56.

When current is discontinued or removed from the coil 12, there remains no further magnetic attraction between the pole member 30 and the plunger 32 such that the pole member 30 may move to the right, in orientation shown in FIG. 2B under the bias of the compressed spring 56. The amount of movement of the pole member 30 is limited by the length of the slot 54 such that the pole member 30 moves to the right a distance equal to the length of the slot 54 re-establishing the air gap 46 as shown in FIG. 2C at the same distance as in the position shown in FIG. 2A.

A workpiece, not shown, attached to the plunger 32 thus moves forward an incremental distance equal to the length of the air gap 46 for each separate energization of the linear motor 10.

The operation of the linear motor 10 also requires unidirectional latch means to retain the pole member 30 and the plunger 32 in their advanced positions and to prevent movement of the pole member 30 and the plunger 32 in a reverse, opposed direction. In this manner, the pole member 30 and the plunger 32 incrementally advance in one direction, such as to the right in orientation shown in FIGS. 1, 2A, 2B and 2C, in incremental steps equal to the length of the air gap 46.

The latch means denoted in general by reference number 62 in FIG. 1 may be constructed in any number of different configurations. One embodiment of the latch means 62 is shown in FIG. 1, and in detail in FIGS. 3 and 4.

This embodiment of the latch means 62 comprises a thin plate 64 having two angularly disposed legs or portions 66 and 68 which are disposed at a predetermined angle with respect to each other, as shown in FIG. 1. An aperture 70, preferably having a square cross-section, is formed in the first leg 66 of the plate 64 and slidably receives the pole member 30 therethrough. It should be noted that an identical latch 62 is associated with the plunger 32 and has a similar aperture 70 slidably receiving a plunger 32 therethrough.

First and second end caps 74 and 76 are mounted in opposite ends of the magnetic core 14. The end cap 74 has a notch 78 formed therein which receives a biasing means 80. The biasing means 80 is preferably in the form of a coil spring acting on the second leg portion 68 of the plate 64 which is disposed exteriorly of the end cap 74. The biasing means 80 pivots the latch 62 to a first position shown in FIG. 1, in which the pole member 30 is free to advance in one direction, such as to the right in orientation shown in FIG. 1, but is blocked from moving in a reverse, opposed direction or to the left. The blocking movement occurs through engagement with the peripheral edge of the first leg portion 66 of the plate 64 bounding the aperture 70 with the pole member 30 and the engagement of the plate 64 with the end cap 74.

Advance of the pole member 30 to the right in FIG. 1 under the biasing force of the spring 56, as described above, forces the pole member 30 through the aperture 70 in the plate 64. A force supplied to latch 62 pivoting it to a generally upright position will allow the pole member 30 to retract to the left, as described in greater detail hereafter.

The end cap 76 also has a notch 78 housing a biasing means or spring 80 which acts on the latch 62 associated with and acting on the plunger 32. However, the end cap 76 has an elongated arm 82 forming a channel 84 which receives and limits the amount of pivotal movement of the second leg portion 68 of the plate 64. The latch 62 associated with the plunger 32 operates in a similar manner as the latch associated with the pole member 30 to allow sliding incremental movement of the plunger 32 in one direction, such as to the right, but prevents reverse, movement in a opposite direction when urged to the angularly pivoted position shown in FIG. 1 by the biasing spring 80.

Figure 5:
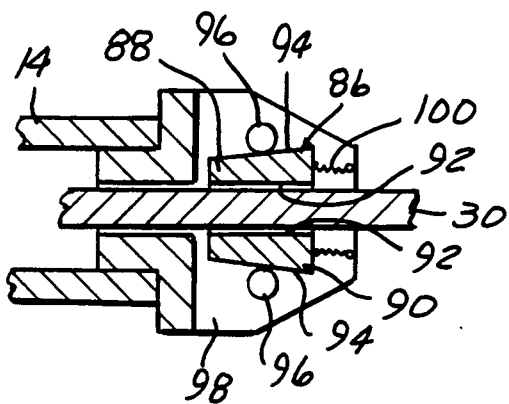
FIG. 5 is a partial, plan view of a wedge latch means usable in the linear motor.

Another embodiment of the latch means which may be employed in the linear motor 10 of the present invention is shown in FIG. 5. FIG. 5 depicts a latch means 86 which is associated with the pole member 30. It will be understood that a similar latch means 86 is associated with the plunger 32 in this embodiment. The latch means 86 includes first and second latch members 88 and 90, respectively, each in the form of a wedge. Each wedge shaped member 88 and 90 has a first planar surface 92 and a second planar surface 94 angularly disposed with respect to the first surface 92. The planar first surface 92 is disposed in sliding engagement with the pole member 30. The angular surface 94 engages a post 96 fixedly mounted on and extending outward from an end cap 98 mounted in end of the magnetic core 14. A biasing means 100 is connected at one end to the end plate 98 and acts on the wedge member, such as wedge member 90, and urges the wedge member 90 to a first position in which the inclined face 94 engaging the post 96 and urges the wedge member 90 into contact with the pole member 30. The two wedge members 88 and 90 act in concert to prevent sliding movement of the pole member 30 in one direction, such as to the left as viewed in FIG. 5. However, movement of the pole member 30 in an opposite direction, i.e., to the right, when the linear motor 10 is energized overcomes the biasing force of the springs 100 and moves the wedge members 88 and 90 out of wedging contact with the pole member 30 to permit advance of the pole member 30 in one direction.

A similar operation occurs for the latch means 62 acting on the plunger 32.

Figure 6:
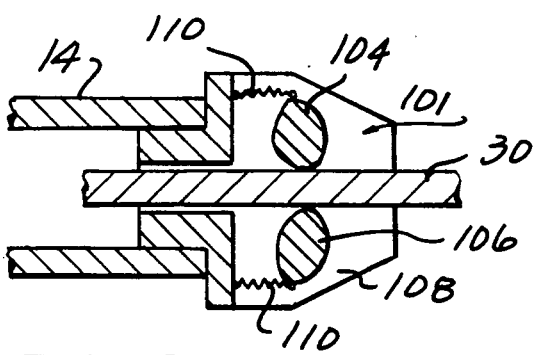
FIG. 6 is a partial, plan view of a cam latch means usable in the linear motor.

FIG. 6 depicts another embodiment of the latch means of the present invention. In this embodiment, the latch means 101 comprises a pair of cams associated with the pole member 30. A second pair of cams is associated with the plunger 32, not shown. The first pair of cams 102 includes first and second cams 104 and 106, respectively, which are rotatably mounted on an end cap 108 fixedly connected to and extending outward from one end of the magnetic core 14. Each of the cams 104 and 106 has an eccentric shape.

Biasing means in the form of coil springs 110 are connected at one end to the end cap 108 and at another end to each of the cams 104 and 106 to bias the cams 104 and 106 to a first position in which the cams 104 and 106 in tandem engage the pole member 30 and prevent movement of the pole member 30 to the left as viewed in FIG. 6. However, due to the eccentric shape of the cams 104 and 106, an opposite movement, such as to the right, of the pole member 30 causes the cams 104 and 106 to rotate permitting advance of the pole member 30 in one direction.

Figure 7:
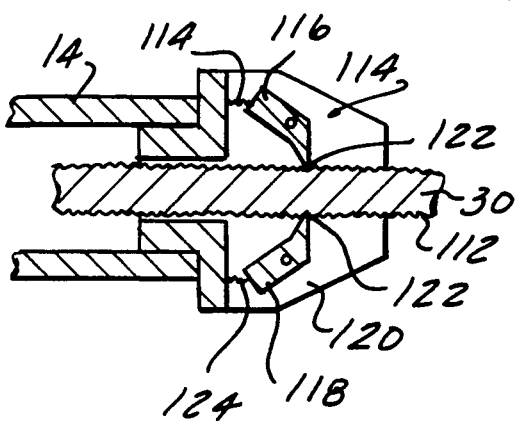
FIG. 7 is a partial, plan view of a pawl latch usable in the linear motor.

Yet another embodiment of the latch means employable with the linear motor 10 of the present invention as shown in FIG. 7. In this embodiment, the pole member 30 and the plunger 32 are each provided with a series of spaced angular teeth 112 on at least a portion thereof. First and second latch means 114 are associated with the plunger 32 and the pole member 30. Each of the latches 114 comprises first and second pawls 116 and 118 which are rotatably mounted on an end cap 120 mounted in and extending outward from one end of the magnetic core 14. The pawls 116 and 118 have a pointed end 122 which fixedly engages the angular teeth 112 formed on the pole member 30. The angle of the teeth 112 is selected to enable the pole member 30 to move to the right during operation of the linear motor 10, as described above. However, reverse movement of the plunger 32 is prevented since the pawls 116 and 118 are biased to a first position by a biasing means in the form of coils springs 124. The coil springs 124 are connected to the end cap 120 and the pawls 116 and 118.

Figure 8:
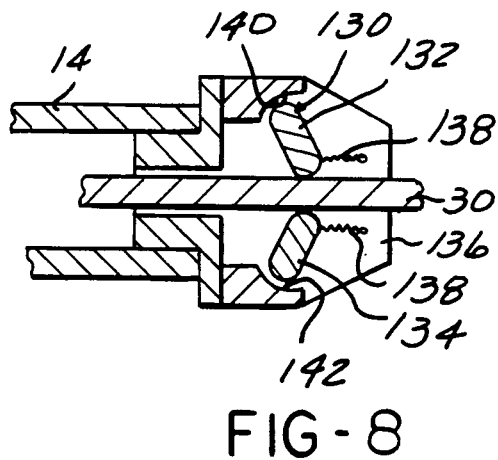
FIG. 8 is a partial, plan view of a sprag latch employable in the linear motor.

FIG. 8 depicts another embodiment of the latch means which includes a latch means 130 associated with and acting on the plunger 32 and the pole member 30. Links 132 and 134 are pivotally mounted on an end plate 136 connected to and extending outward from one end of the magnetic core 14. Biasing means in the form of coil springs 138 are mounted on the end plate 136 and act on one end of the links 132 and 134. Notches 140 and 142 are formed in the end plate 136 and define a surface engageable by each of the links 132 and 134, respectively. The links 132 and 134 and the notches 140 and 142 form a so-called "sprag" latch. The biasing springs 138 bias the links to the position shown in FIG. 8 in which the links 132 and 134 wedge against the pole member 30 in tandem under the force of the biasing springs 138 and engage the notches 140 and 142, respectively, to prevent movement of the pole member 30 to the left as viewed in FIG. 8. However, a reverse movement of the pole member 30 in an opposite direction, i.e., to the right, is allowed since the links 132 and 134 pivot away from the notches 140 and 142, respectively, as the pole member 30 advances, as described above.

Figure 9:
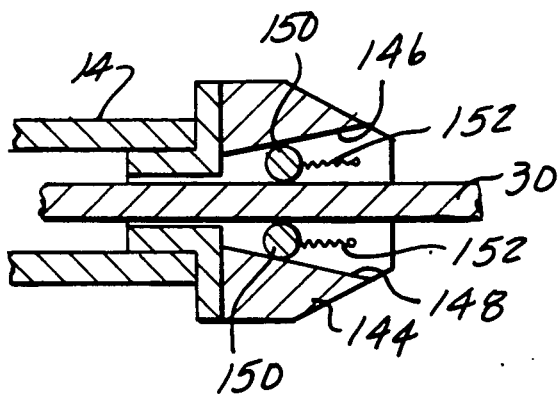
FIG. 9 is a partial, plan view of a roller and ramp latch usable in the linear motor.

Finally, another embodiment of the latch means employable with the linear motor 10 of the present invention is shown in FIG. 9. In this embodiment, the end cap 144 is provided with first and second angularly disposed planar surfaces 146 and 148 which extend angularly outward with respect to each other. A roller 150 is disposed in contact with each of the angular surfaces or ramps 146 and 148 and acts in conjunction with the opposite roller 150 on the pole member 30. Biasing springs 152 are connected to the end plate 144 and act on each of the rollers 150 to wedge the rollers 150 along the ramps 146 and 148 into wedging contact with the pole member 30 to prevent retraction of the pole member 30 to the left as viewed in FIG. 9.

However, advance of the pole member 30 to the right when the air gap 46 is re-established is possible since such movement overcomes the force of the biasing springs 152 and urges the rollers 150 outward away from wedging contact with the pole member 30.

Although the latch means and shown in FIGS. 5-9 has been described in conjunction with the pole member 30, it will be understood that an identical latch means is associated with and acts on the plunger 32. Each latch means functions identically to allow advance movement of the pole member 30 and the plunger 32 in one direction when current is applied to the coil 12 or the air gap is re-established; but prevent movement of the pole member 30 and the plunger 32 in an opposite direction. In this manner, the pole member 30 and the plunger 32 are held at each incremental advanced position.

Figure 3:
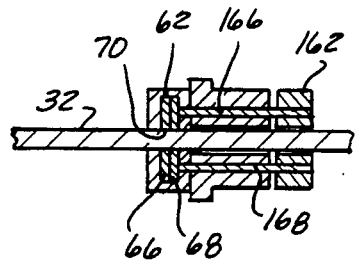
FIG. 3 is a side, cross-sectional, plan view of the permanent magnet latch release means shown in FIG. 1.
Figure 4:
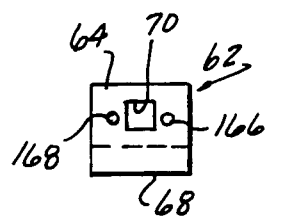
FIG. 4 is an end view of the latch shown in FIG. 1.

The linear motor 10 also includes latch release means for releasing the unidirectional latch means from their first position allowing only unidirectional movement of the pole member 30 and the plunger 32 to a second position permitting the pole member 30 and the plunger 32 to be freely retracted to the start or home position. Such latch release means may be provided in several different configurations. One embodiment of the latch release means is shown in FIGS. 1, 3 and 4 and comprises a permanent magnet type latch release means. This latch release includes first and second permanent magnets 160 and 162 which are slidably disposed at opposite ends within the magnetic core 14 as shown in FIG. 1. The permanent magnets 160 and 162 have opposite polarities and a generally cylindrical cross-section so as to slidably fit within the magnetic core 14 and be movable with respect to the core 14.

The permanent magnets 160 and 162 are disposed inward of the end caps 74 and 76 and beyond the outer extent of the coil 12. Each of the permanent magnets 160 and 162 further includes a central bore 164 through which the pole member 30 and the plunger 32 slidably extend.

In this embodiment, the end caps 74 and 76 are formed of a non-ferrous material. The permanent magnets 160 and 162 form a part of the magnetic circuit of the linear motor 10 and close the magnetic flux path between the magnetic core 14 and the magnetic plunger 32 and the pole member 30.

The latch release means also include at least one and preferably two release pins 166 and 168 as shown in FIGS. 1, 3 and 4. The release pins are in the form of elongated rods fixedly connected at one end to one of the permanent magnets, such as the magnet 162 shown in FIG. 3. The other end of each of the release pins 166 and 168 engages the first leg portion 66 of the latch 62. shown in FIGS. 1, 3 and 4.

In operation, the polarity of the permanent magnets 160 and 162 are chosen such that the magnets 160 and 162 remain stationary when current of a first polarity is applied to the coil 12 to incrementally advance the plunger 32 as described above. When the polarity of the current applied to the coil 12 is reversed, the magnet 162 will be attracted toward the core 14; while the magnet 160 will be repelled from the coil 12 and moved outward toward the end of the magnetic core 14. The release pins 166 and 168 connected to the magnet 162 hold the latch member associated with the plunger 32 upright thereby allowing the plunger 32 to be retracted to the left opposite from the incremental advance direction of movement of the plunger 32 described above.

The outward movement of the magnet 160 causes the release pins 166 and 168 connected thereto to push against the first leg 66 of the latch 62 associated with the pole member 30 causing the latch 62 to pivot to a substantially upright position from the angular position shown in FIG. 1 to allow retraction of the pole member 30. Discontinuance of current to the coil 12 causes the magnetic attraction and repulsion of the magnets 160 and 162 to cease such that the latches 62 pivot to their angular position shown in FIG. 1 under the influence of the biasing springs 80 described above.

Another embodiment of the latch release means is shown in FIGS. 10, 11 and 12. In this embodiment, the latch release means comprises a co-axial solenoid and release rod. FIG. 10 depicts a linear motor 10 constructed substantially as described above with like components having the same reference number shown in FIG. 1. Thus, the linear motor 10 is constructed with a magnetic core 14, a coil 12, a pole member 30, a plunger 32 and a biasing means denoted by reference number 40, all of which operate as described above for the embodiment shown in FIG. 1. End caps 170 and 172 are mounted in opposite ends of the magnetic core 14 and are preferably formed of a ferrous material to complete the magnetic path through the magnetic core 14, the pole member 30 and the plunger 32.

Latch members 174 generally constructed as shown in FIG. 11 are mounted at opposite ends of the magnetic core 14 proximate the end caps 170 and 172. The latches 174 are substantially identical in configuration and operation to the latches 62 shown in FIG. 1, 3 and 4 and described in detail above.

The co-axial solenoid latch release means is denoted in general by reference number 180 in FIG. 10 and comprises a solenoid mounted concentrically about the magnetic core 14. The solenoid 180 comprises a coil 182 and an outer magnetic core 184. The solenoid 180 is fixedly mounted at an intermediate position between the ends of the magnetic core 14 as shown in FIG. 10. A plunger 186 is associated with the solenoid 180 and is slidably disposed about the magnetic core 14.

At least one and preferably two release rods 188 extend from the plunger 186 to the latch 174 associated with the plunger 32. Similar release rods 190 extend from the plunger 186 to the latch 174 associated with the pole member 30. The release rods 188 extend through the latch 174 and have an enlarged end portion which acts on the latch 174 to pivot the latch between positions as described hereafter. A biasing means, such as a spring 192 connected to the end cap, acts on a lower portion of the latch 174 to normally bias the latch 174 to the angular pivoted position preventing retraction of the plunger 32 or pole member 30 as described above.

In operation, when an electric current is applied to the coil 182 of the solenoid 180, the plunger 186 will be drawn toward the magnetic core 184. This movement of the plunger 186 to the right in orientation shown in FIG. 10, draws the retainer release rods 188 connected to the latch 174 associated with the plunger 32 to the right causing pivoting of the leftmost latch 174 to a substantially upright position from the angular position shown in FIG. 12 allowing the plunger 32 to be freely retracted to the left. At the same time, the release rods 190 extending from the plunger 186 to the latch 174 associated with the pole member 30 move to the right with movement of the plunger 186 causing a similar pivoting of the latch 174 associated with the pole member 30 to an upright position allowing the pole member 30 to be likewise retracted to the left.

Discontinuance of electric current to the coil 182 causes the magnetic field in the solenoid 180 to collapse and discontinues the magnetic attraction between the magnetic core 184 and the plunger 186. The biasing springs 192 acting on the latches 174 then urge the latches 174 to the pivoted positions shown in FIGS. 10 and 12 in which the latches 174 prevent further retraction of the pole member 30 and the plunger 32.

Figure 13:
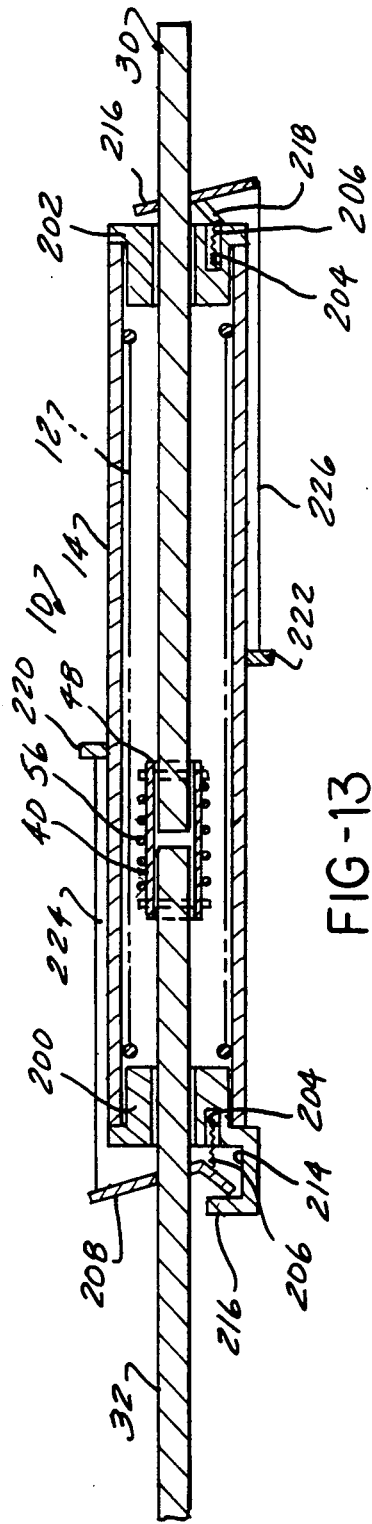
FIG. 13 is a side, cross-sectional view of another embodiment of the linear motor showing a shape memory latch release means.
Figure 14:
FIG. 14 is a left-end view of one latch shown in FIG. 13.
Figure 15:
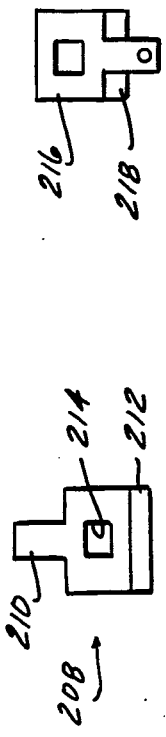
FIG. 15 is a right-end view of one latch shown in FIG. 13.

The linear motor 10 shown in FIG. 13 is provided with another embodiment of a latch release means utilizing a shape alloy latch release mechanism. In this embodiment, the end caps 200 and 202 are formed of a ferrous material and complete a magnetic path with the magnetic core 12, the pole member 30 and the plunger 32. Each of the end caps 200 and 202 has a notch 204 formed therein which receives a biasing spring 206 which acts on one portion of the latch. The latch 208 associated with and acting on the plunger 32, as shown in FIGS. 13 and 14, has a first leg portion 210 and a second, angular portion 212. A central aperture 214 is formed in the first leg portion 210 and slidably receives the plunger 32 therethrough. The biasing spring 206 acts on the second leg portion 212. The second leg portion 212 is also pivotably disposed within a channel 214 formed in an extended arm portion 216 of the end cap 200. The latch 216 acting on the pole member 30 has a generally planar shape with an angularly disposed, intermediate flange 218 formed thereon and extending angularly outward from one side of the planar portion of the latch 216.

First and second flanges 220 and 222 are attached to and extend outward from the outer surface of the magnetic core 14 at a generally intermediate portion between the opposite ends of the magnetic core 14 as shown in FIG. 13. An elongated wire formed of a shape alloy, such as a Nitonol wire 224 extends from the flange 220 to one end portion of the latch 208 associated with the plunger 32. An identical wire 226 is connected to and extends from the flange 222 to one end of the latch 216 associated with the pole member 30. As is well known, such shape alloy wires 224 and 226 contract or shrink when heated, such as when an electric current is applied thereto. Such contraction of the wires 224 and 226 will exert a force on and cause a pivoting of the associated latches 208 and 216 pivoting the latches to a generally upright position permitting retraction of the plunger 32 and the pole member 30. Cooling of the wires 224 and 226 releases the pivoting force on the latches 208 and 216 such that the latches 208 and 216 pivot to the angular position shown on FIG. 13 under the influence of the biasing springs 206. In the angular position shown in FIG. 13, the latches 208 and 216 permit incremental advance of the plunger 32 and the pole member 30 as described above; but prevent a retraction movement in an opposite direction.

In addition to Nitonol wire, bimetallic strips or piezoelectric elements which distort under heat, such as heat generated by an electric current flowing through such elements, may also be employed.

It will be understood that although the latch release means shown in FIGS. 1, 10 and 13 had been described with an aperture plate-type latch, any of these latch release means may be employed with any of the latches shown in FIGS. 5-9 with only slight modifications to provide connection between the operative elements of the latch release means and the moving or pivotable members of the latches.

Figure 16:
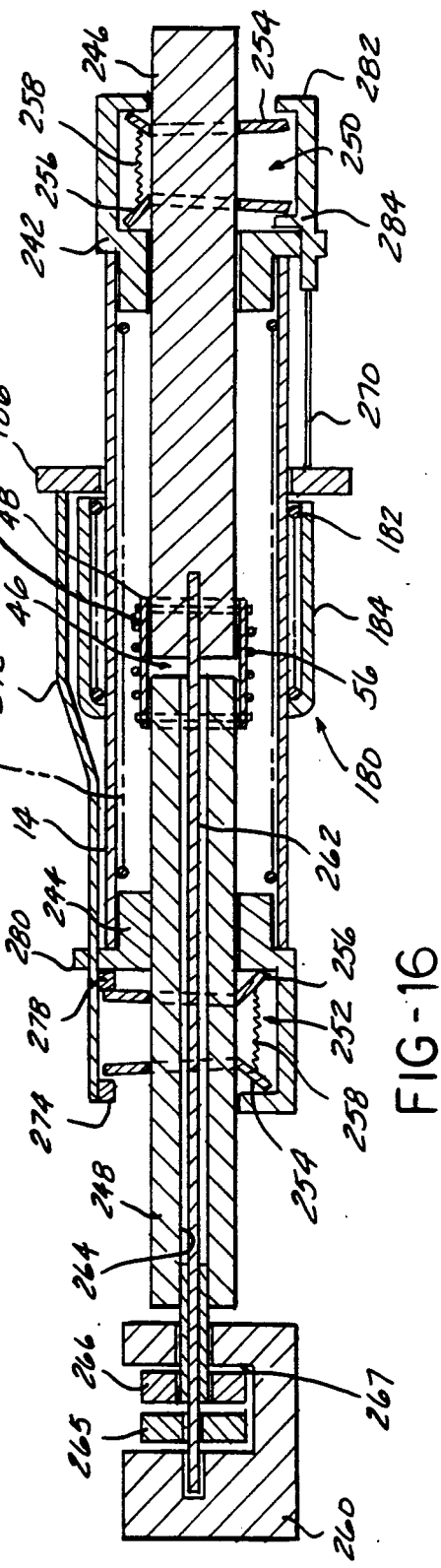
FIG. 16 is a side, cross-sectional view of another embodiment of the linear motor constructed for bi-directional operation.

Refer now to FIG. 16, there is illustrated another embodiment of a linear motor constructed in accordance with the teachings of the present invention. The linear motor 240 is similar to the linear motor 10 shown in FIG. 12 insofar as the linear motor 240 includes a magnetic core 14 surrounding a coil 12. End caps 242 and 244 are fixedly mounted at opposite ends of the magnetic core 14 and are formed of a ferrous material to form a part of the magnetic path through the magnetic core 14. A first movable magnet member 246 is slidably disposed within one end of the magnetic core 14 and coil 12 and extends axially outward therefrom through the end cap 242 as shown in FIG. 16. A second movable magnetic member 248 is slidably disposed within and extends outward from the opposite end of the magnetic core 14 and coil 12 as well as extending through the end cap 244. Both of the first and second movable members 246 and 248, respectively, are formed of a magnetic material to complete the magnetic path through the magnetic core 14 and the end caps 242 and 244.

A biasing means 40 is provided to establish an air gap 46 between the opposed faces of the first and second movable magnetic members 246 and 248. The biasing means 40 is identically constructed to that described above and shown in FIGS. 1, 2A, 2B and 2C and, as such, will not be described in detail herein.

The linear motor 240 is constructed for bi-directional advance of the first and second movable members 246 and 248 and includes first and second bi-directional latch means 250 and 252, respectively. Each of the first and second latch means 250 and 252 is identically constructed; but orientated in an opposite or inverted manner as shown in FIG. 16. Further, each of the latch means, such as latch means 252, is formed of first and second, identical latch members 254 and 256. Each of the latch members 254 and 256 comprise an apertured plate, such as the plate 64 shown in FIG. 4. Each of the latch members 254 and 256 further includes a central aperture through which the magnetic member 248 slidably extends. The latch members forming the other latch means 250 are similarly constructed and slidably receive the first movable member 246. A biasing means 258 is mounted between and connected at opposite ends to the latch members 254 and 256 of each latch means 250 and 252 to normally bias the latch members 254 and 256 apart.

Means are provided for decoupling a load, such as a workpiece which is connected to an output fork 260, from the movable members such that either of the first or second movable members 246 and 248 may act as the pole member in the linear motor 240. The decoupling means comprises an elongated rod 262 which is connected at one end to the first movable member 246. The rod 262 extends through a bore 264 formed in the second movable member 248. The rod 262 is preferably insulated from the second movable member 248 by means of a suitable coating provided on the rod 262 or the interior of the bore 264.

An output collar 265 is fixedly connected to the rod 262 and is slidably disposed in a recess in the output fork 260. The collar 265 moves with movement of the member 246. When the second movable member 248 is to act as the pole member of the linear motor 240, attraction of the first movable member 246 toward the second movable member 248, as described above in the various embodiments of the linear motor of the present invention, will cause an extension of the rod 262 and an abutment of and movement of the output collar 265 with the output fork. When the biasing spring 56 of the biasing means 40 causes an extension of the second movable member 248 from the first movable member or plunger 246 to re-establish the air gap 46 between the first and second movable members 246 and 248, the exterior end of the second movable member 248 will advance but cause no further movement of the output fork 260.

A similar operation occurs when the first movable member 246 acts as the pole member of the linear motor 240. However, in the mode of operation, the incremental advance of the second magnetic member 248 advances an output collar 266 rigidly connected to a sleeve 267 attached to the movable member 248. The collar 266 abuts and advances the output fork 260 an incremental distance corresponding to the incremental advance movement of the second movable member 248.

The latch members 254 and 256 of the latch means 250 as well as the latch members 254 and 256 of the second latch means 252 are normally disposed at an angular position with respect to the associated movable member. Latch release means denoted by reference number 180 and constructed similar to that described above and illustrated in FIG. 10 is mounted on the linear motor 240 exteriorly from the magnetic core 14. The latch release means 180 comprises an outer magnetic core 182 which surrounds a coil 182. A movable plunger 186 is mounted exteriorly about the magnetic core 14 and is retracted toward the outer magnetic core 184 when an electric current is applied to the coil 182. First and second transfer rods 270 and 272 extend from opposite sides of the plunger 186 to the first and second latch means 250 and 252, respectively. The second transfer rod 272 has first and second stops 274 and 278 mounted in a spaced apart arrangement at an outer end. The transfer rod 272 is supported in a flange 280 formed on the end cap 244 and slides therethrough. The stops 274 and 278 respectively engage the latch members 254 and 256 to cause pivoting movement of the latch members 254 and 256 to create the bi-directional movement of the linear motor 240 as described hereafter.

The first transfer rod 270 likewise has stop members 282 and 284 formed in a spaced apart arrangement at an outer end for engaging one end of the latch members 254 and 256, respectively, of the latch means 250. In a normal, de-energized position, one of the latch members, such as latch member 254 of the first latch means 250 and latch member 254 in the second latch means 252 will be positioned in a substantially vertical position allowing incremental advance of the respective first and second movable members 246 and 248 in one direction. This is achieved by the positioning of the transfer rods 270 and 274 so as to engage and pivot the respective latch members 254 to an upright, substantially vertical position. The opposite latch member 256 of each of the first and second latch means 250 and 252 is positioned at an angle so as to prevent reverse movement of the respective first and second movable members 246 and 248 in an opposite direction.

Energization of the coil 182 of the latch release means 180 will cause the plunger 186 to be attracted towards the magnetic core 184 causing a movement of the respective stops 274 and 278 and the stops 282 and 284 with respect to the first and second latch means 250 and 252. This causes a pivoting action of the latch members 256 of each of the first and second latch means 250 and 252 to a position allowing incremental advance movement of the first and second movable members 246 and 248 in an opposite direction from the first described incremental advance direction; while at the same time preventing a reverse movement in the first direction.

FIG. 17, 18, 19A, 19B and 19C depicts yet another embodiment of the linear motor constructed in accordance with the teachings of the present invention. The linear motor 300 shown in FIG. 17 includes a magnetic plunger 302 and a magnetic pole member 304. A guide rod 306 is connected at one end to the plunger 302 and extends through a bore 308 formed in the pole member 304. The guide rod 306 is insulated from the magnetic pole member 304 by means of a suitable insulated coating 310 formed preferably on the guide rod 306.

One end of the guide rod 306 extends through the contact body 312 and is fixedly connected to a rotator body 332. The contact body 312 is also formed of an electrical insulating material and has a central spherical portion 314 with two outwardly extending, planar tabs 316 and 318. Slots 320 and 322 are formed in the contact body 312 between the tabs 316 and 318 and the central spherical body portion 314 and slidably receive a contact 324. The contact 324 has a central arcuate shaped portion 326 and two planar end flanges 328 and 330. The contact 324 is preferably formed of a suitable electrically conductive material, such as copper or brass.

The rotator body 332 is spaced from the contact body 312. The rotator body 332 has a centrally located recess 334 which slidably receives the planar ends 328 and 330 of the contact 324 as described hereafter. A central bore 336 is formed in the rotator body 332 for receiving the end of the guide rod 306. Retainer members 338 and 340 extend around the peripheral edges of the rotator body 332 and connect the rotator body 332 to the tabs 316 and 318 of the contact body 312. Tabs 342 extend outward from the retainer members 338 and 340 and form an attachment for a biasing means, such as coil springs 344 and 346, which are connected in an insulated manner to the outer ends of a flange portion 348 formed on one end of the pole member 304.

Rotating means in a form of a plurality of circumferentially spaced, open-ended ramps 350 are formed in the face of the rotator body 332 adjacent the centrally located recess 334 in the rotator body 332. Rollers 352 are disposed in each ramp 350 and are biased by a coil spring 354 outward from the closed end of each ramp 350.

The rollers 352 engage the flanges tabs 316 and 318 on the contact 312 body and, due to the inclined ramp surface of each ramp 350, cause a rotation of the contact body 312 and the contact 324 mounted therein during each successive advance of the plunger 302 as described hereafter.

An electric circuit is connected to the pole member 304 and the plunger 302 as shown in FIG. 17. A voltage source 360 is connected to a first brush or contact means 362 associated with the plunger 302. A coil 364 is connected in parallel with a capacitor 366. Both the coil 364 and the capacitor 366 are connected in series with the voltage source 360. An output lead from the parallel connected capacitor 366 and coil 364 is connected to a second brush or contact 368. The coil 364 is disposed about the plunger 302 and the pole 304 as in the other embodiments of this invention. The contact 324 is connected as a single pole, single throw switch between the plunger 302 and the pole 304 to control the application of current to the coil 364.

The operation of the linear motor 300 will now be described in conjunction with FIGS. 19A, 19B and 19C which respectively illustrate the position of the components of the linear motor 300 during each successive incremental advance of the linear motor 300. In an initial, de-energized condition, FIG. 19A, the contact 324 is fully seated on the contact body 312 and is in contact with one end of the pole member 304. When current flows through the capacitor 366 in the circuit shown in FIG. 17, the capacitor 366 charges and the magnetic field in the coil 364 builds up thereby drawing the plunger 302 toward the pole member 304 as shown in FIG. 19B. As the plunger 302 advances toward the pole member 304, the contact 324 remains in contact with the pole member 304 through a predetermined distance of travel of the plunger 302 or over a substantial portion of the working air gap 303 initially formed between the plunger 302 and the pole member 304.

As shown in FIG. 19B, at a certain point in the advance of the plunger 302 toward the pole member 304, the contact 324 moves away from the pole member 304 breaking the electrical circuit therebetween. The capacitor 366 dumps its energy into the coil 364 thereby maintaining the magnetic attraction force between the plunger 302 and the pole member 304 which continues to draw the plunger 302 toward the pole member 304 to completely close the air gap 303 originally formed therebetween.

When the plunger 302 and the guide rod 306 attached thereto reach the position shown in FIG. 19C, the biasing springs 344 and 346, which have been extended during the advance of the guide rod 306 and the rotator body 332, will cause the pole member 304 to move to the right into contact with the contact 324 and open the air gap between the plunger 302 and the pole 304. With the circuit thereby re-established, the capacitor 366 begins to charge. However, a build up of the magnetic field in the coil 364 is prevented until the pole member 304 has sufficient time to fully seat the contact 324 against the contact body 312 such that the components are in the position shown in FIG. 19A.

During the charge up time of the capacitor 366, pressure of the pole member 304 against the contact 324 and the contact body 312 translates through the rollers 352 and the inclined ramps 350 in the rotator body 332 to impart a positive rotation to the contact body 312 and the contact 314. This provides a wiping or cleaning action on the contact 324 thereby insuring efficient operation of contact 324.

In summary, there have been disclosed an improved linear motor which has a small, compact size. Latch release means are provided on the linear motor in various configurations for automatically releasing the unidirectional latch means to enable the incrementally advanced pole member and plunger to be retracted to a start or home position. The linear motor may also be constructed for reversible, bi-directional movement of the pole member and the plunger.

What is claimed is:

1. A linear motor comprising:
   a coil formed of a plurality of windings;
   a magnetic core surrounding the coil;
   a magnetic pole member movably disposed within and extending partially outward from one end of the coil and the core;
   a magnetic plunger movably disposed within and extending partially outward from another end of the coil and the core, the plunger being co-axially aligned with the pole member and normally spaced from one end of the pole member by an air gap;
   the core, the pole member and the plunger forming a magnetic flux path when current is applied to the coil to urge the plunger into contact with the pole member to close the air gap therebetween;
   biasing means, connected between the pole member and the plunger, for biasing the pole member and the plunger apart to re-establish the air gap therebetween and to advance the pole member an incremental distance equal to the length of the air gap; and
   unidirectional latch means for allowing successive one direction movements of the pole member and the plunger with respect to the core and the coil upon each successive energization and de-energization of the coil.

2. The linear motor of claim 1 wherein the biasing means comprises:
   a coil spring having first and second ends, the first end acting on the pole member and the second end acting on the plunger.

3. A linear motor comprising:
   a coil formed of a plurality of windings;
   a magnetic core surrounding the coil;
   a magnetic pole member movably disposed within and extending partially outward from one end of the coil and the core;
   a magnetic plunger movably disposed within and extending partially outward from another end of the coil and the core, the plunger being co-axially aligned with the pole member and normally spaced from one end of the pole member by an air gap;
   the core, the pole member and the plunger forming a magnetic flux path when current is applied to the coil to urge the plunger into contact with the pole member to close the air gap therebetween;
   biasing means, connected between the pole member and the plunger, for biasing the pole member and the plunger apart to reestablish the air gap therebetween and to advance the pole member an incremental distance equal to the length of the air gap, the biasing means including:

a tubular sleeve surrounding the opposed ends of the pole member and the plunger and the air gap therebetween;

pin means extending through the opposed ends of the pole member and the plunger and disposed in opposite ends of the sleeve for mounting the sleeve to the pole member and the plunger;

a coil spring surrounding the tubular sleeve, the coil spring having first and second ends each joined to one of the pin means such that the first end of the spring acts on the pole member and the second end of the spring acts on the plunger; and a slot formed in one end of the tubular sleeve and receiving one of the pins means therethrough, the slot defining the length of the air gap when the biasing means urges the pole member and the plunger apart; and unidirectional latch means for allowing successive one direction movements of the pole member and the plunger with respect to the core and the coil upon each successive energization and deenergization of the coil.

4. A linear motor comprising:
a coil formed of a plurality of windings;
a magnetic core surrounding the coil;
a magnetic pole member movably disposed within and extending partially outward from one end of the coil and the core;
a magnetic plunger movably disposed within and extending partially outward from another end of the coil and the core, the plunger being co-axially aligned with the pole member and normally spaced from one end of the pole member by an air gap;
the core, the pole member and the plunger forming a magnetic flux path when current is applied to the coil to urge the plunger into contact with the pole member to close the air gap therebetween;
biasing means, connected between the pole member and the plunger, for biasing the pole member and the plunger apart to re-establish the air gap therebetween and to advance the pole member an incremental distance equal to the length of the air gap; and
unidirectional latch means for allowing successive one direction movements of the pole member and the plunger with respect to the core and the coil upon each successive energization and deenergization of the coil, the unidirectional latch means including:

at least one first latch associated with and acting on the pole member and at least one second latch associated with and acting on the plunger;

each of the first and second latches comprising:
a plate member having first and second angularly disposed legs;
an aperture formed in one of the first and second legs of the plate member and slidably receiving one of the pole member and the plunger therethrough; and
means, connected between the magnetic core and the first and second latches, for biasing the first and second latches to a first position in which the pole member and the plunger are freely moveable in one direction therethrough and a second position in which the plate member of the first and second latches engages the pole member and the plunger to prevent movement of the pole member and the plunger in an opposite direction.

5. The linear motor of claim 1 wherein the unidirectional latch means comprises:
a first pair of latches associated with and acting on the pole member and a second pair of latches associated with and acting on the plunger;
each latch of each of the first and second pair of latches comprising:
a wedge member having a first flat surface and a second flat surface inclined with respect to the first surface;
a post;
the inclined surface of the wedge member acting on the post; and
biasing means urging each wedge member to a first position in which each wedge member is wedged between the post and one of the pole member and plunger to prevent movement of the pole member and the plunger in one direction, but allowing movement of the pole member and the plunger in an opposite direction.

6. The linear motor of claim 1 wherein the unidirectional latch means comprises:
a first pair of latches associated with and acting on the pole member;
a second pair of latches associated with and acting on the plunger;
each latch of the first and second pair of latches comprising an eccentric cam;
biasing means acting on each of the cams of the first and second pair of latches for biasing each of the cams to a first position in which the eccentric portions of the cams in each pair of latches engages one of the pole member and plunger to prevent movement of the pole member and the plunger in a first direction, but allowing movement of the pole member and the plunger in an opposite, reverse direction.

7. A linear motor comprising:
a coil formed of a plurality of windings;
a magnetic core surrounding the coil;
a magnetic pole member movably disposed within and extending partially outward from one end of the coil and the core;
a magnetic plunger movably disposed within and extending partially outward from another end of the coil and the core, the plunger being co-axially aligned with the pole member and normally spaced from one end of the pole member by an air gap;
the core, the pole member and the plunger forming a magnetic flux path when current is applied to the coil to urge the plunger into contact with the pole member to close the air gap therebetween;
first biasing means, connected between the pole member and the plunger, for biasing the pole member and the plunger apart to re-establish the air gap therebetween and to advance the pole member an incremental distance equal to the length of the air gap;
unidirectional latch means for allowing successive one direction movements of the pole member and the plunger with respect to the core and the coil upon each successive energization and deenergization of the coil; and first and second end caps attached to opposite ends of the magnetic core; the unidirectional latch means further comprising:

first and second angularly disposed planar, ramp surfaces formed in each of the first and second end caps;

a roller disposed between and acting on each ramp surface and one of the pole member and the plunger; and second biasing means for urging each roller to a first position in which the roller is wedged between the ramp surface and one of the pole member and plunger to prevent movement of the pole member and the plunger in one direction, but allowing movement of the pole member and the plunger in an opposite direction.

8. A linear motor comprising:

a coil formed of a plurality of windings;

a magnetic core surrounding the coil;

a magnetic pole member movably disposed within and extending partially outward from one end of the coil and the core;

a magnetic plunger movably disposed within and extending partially outward from another end of the coil and the core, the plunger being co-axially aligned with the pole member and normally spaced from one end of the pole member by an air gap;

the core, the pole member and the plunger forming a magnetic flux path when current is applied to the coil to urge the plunger into contact with the pole member to close the air gap therebetween;

biasing means, connected between the pole member and the plunger, for biasing the pole member and the plunger apart to re-establish the air gap therebetween and to advance the pole member an incremental distance equal to the length of the air gap; and unidirectional latch means for allowing successive one direction movements of the pole member and the plunger with respect to the core and the coil upon each successive energization and deenergization of the coil, the unidirectional latch means including:

each of the pole member and the plunger having a plurality of angularly disposed teeth formed on an exterior portion thereof;

a first pair of pawls associated with and engaging the teeth on the pole member;

a second pair of pawls associated with and engaging the teeth on the plunger; and means, connected between each of the first and second pairs of pawls, for urging the pawls in each of the first and second pairs of pawls to a first position engaging the teeth on the pole member and the plunger to allow unidirectional movement of the pole member and the plunger in one direction and preventing movement of the pole member and plunger in an opposite direction.

9. The linear motor of claim 1 wherein the unidirectional latch means comprises:

a pair of end plates, each mounted on and extending outward from opposite ends of the magnetic core;

first and second pairs of sprags associated with and acting on the pole member and plunger, respectively;

each of the first and second pairs of sprags comprising:

opposed notches formed in each end plate mounted on the end of the magnetic core;

a pair of links engaging one of the pole member and the plunger at one end and the notches at another end; and means for biasing the links of each of the first and second pairs of sprags into a first position in which the links are wedged between the notch and one of the pole member and the plunger to prevent movement of the pole member and the plunger in one direction, but allowing movement of the pole member and the plunger in a opposite direction.

10. The linear motor of claim 1 further including:

latch release means for releasing the unidirectional latch means to enable retraction of the pole member and the plunger to a start position in a direction opposite to the direction of advance movement of the pole member and the plunger.

11. A linear motor comprising:

a coil formed of a plurality of windings;

a magnetic core surrounding the coil;

a magnetic pole member movably disposed within and extending partially outward from one end of the coil and the core;

a magnetic plunger movably disposed within and extending partially outward from another end of the coil and the core, the plunger being co-axially aligned with the pole member and normally spaced from one end of the pole member by an air gap;

the core, the pole member and the plunger forming a magnetic flux path when current is applied to the coil to urge the plunger into contact with the pole member to close the air gap therebetween;

biasing means, connected between the pole member and the plunger, for biasing the pole member and the plunger apart to re-establish the air gap therebetween and to advance the pole member an incremental distance equal to the length of the air gap;

unidirectional latch means for allowing successive one direction movements of the pole member and the plunger with respect to the core and the coil upon each successive energization and de-energization of the coil; and latch release means for releasing the unidirectional latch means to enable retraction of the pole member and the plunger to a start position in a direction opposite to direction of advance movement of the pole member and the plunger, the latch release means including:

first and second end caps fixedly mounted in opposite ends of the magnetic core, the first and second end caps being formed of a non-ferrous material;

first and second magnets of opposite polarity slidably disposed within opposite ends of the magnetic core inward of the first and second end caps, respectively, and forming a part of the magnetic core flux path;

the pole member and the plunger slidably extending through the first and second end caps and the first and second permanent magnets, respectively; and at least one pin connected to each of the first and second permanent magnets and acting on the unidirectional latch means spaced from the first and second permanent magnets such that when the first and second magnets slide outward from the coil when an electric current of one polarity is applied to the coil, the pin moves the latch means to a position allowing movement of the pole member and the plunger in a direction opposite the direction of incremental advance of the pole member and the plunger.

12. A linear motor comprising:
a coil formed of a plurality of windings;
a magnetic core surrounding the coil;
a magnetic pole member movably disposed within and extending partially outward from one end of the coil and the core;
a magnetic plunger movably disposed within and extending partially outward from another end of the coil and the core, the plunger being co-axially aligned with the pole member and normally spaced from one end of the pole member by an air gap;
the core, the pole member and the plunger forming a magnetic flux path when current is applied to the coil to urge the plunger into contact with the pole member to close the air gap therebetween;
biasing means, connected between the pole member and the plunger, for biasing the pole member and the plunger apart to reestablish the air gap therebetween and to advance the pole member an incremental distance equal to the length of the air gap;
unidirectional latch means for allowing successive one direction movements of the pole member and the plunger with respect to the core and the coil upon each successive energization and deenergization of the coil; and
latch release means for releasing the unidirectional latch means to enable retraction of the pole member and the plunger to a start portion in a direction opposite to direction of advance movement of the pole member and the plunger, the latch release means including:
first and second end caps fixedly mounted on opposite ends of the magnetic core and formed of a ferrous material;
a solenoid formed of a magnetically coupled core and coil concentrically disposed about the magnetic core of the linear motor;
a plunger associated with the solenoid and slidably mounted on the magnetic core of the linear motor; and
at least one latch release rod connected to the plunger at one end and to each of the unidirectional latch means of the pole member and the plunger at an opposite end;
the pole member being attracted to the solenoid when current of a first polarity is applied to the coil of the solenoid to move the unidirectional latch means through the latch release rods to a position allowing movement of the pole member of the plunger in a direction opposite to the direction of incremental advance of the pole member and the plunger.

13. linear motor comprising:
a coil formed of a plurality of windings;
a magnetic core surrounding the coil;
a magnetic pole member movably disposed within and extending partially outward from one end of the coil and the core;
a magnetic plunger movably disposed within and extending partially outward from another end of the coil and the core, the plunger being co-axially aligned with the pole member and normally spaced from one end of the pole member by an air gap;
the core, the pole member and the plunger forming a magnetic flux path when current is applied to the coil to urge the plunger into contact with the pole member to close the air gap therebetween;
biasing means, connected between the pole member and the plunger, for biasing the pole member and the plunger apart to re-establish the air gap therebetween and to advance the pole member
unidirectional altach means for allowing successive one
unidirectional latch means for allowing successive one direction movements of the pole member and the plunger with respect to the core and the coil upon each successive energization and de-energization of the coil; and
latch release means for releasing the unidirectional latch means to enable retraction of the pole member and the plunger to a start portion in a direction opposite to direction of advance movement of the pole member and the plunger, the latch release means including:
first and second end caps fixedly mounted on opposite ends of the magnetic core and forming a part of the magnetic flux path of the magnetic core;
the pole member and the plunger slidably extending through the first and second end caps, respectively; and
a rod formed of a shape memory material extending between and connected to the magnetic core and the unidirectional latch means associated with each of the pole member and the plunger;
the rod changing shape when heated to cause movement of the unidirectional latch means to a position allowing the pole member and the plunger to be moved in a direction opposite to the direction of incremental advance of the pole member and the plunger.

14. A linear motor comprising:
a coil formed of a plurality of windings;
a magnetic core surrounding the coil;
a first magnetic movable member movably disposed within and extending partially outward from one end of the coil and the core;
a second magnetic movable member movably disposed within and extending partially outward from the other end of the coil and the core, the second magnetic movable member being co-axially aligned with the first magnetic movable member and normally spaced from one end of the first magnetic movable member by an air gap;
the magnetic core and the first and second magnetic movable members forming a magnetic flux path when current is supplied to the coil to urge the second magnetic movable member into contact with the first magnetic movable member to close the air gap therebetween;
biasing means, connected between the first and second magnetic movable members, for biasing the first magnetic movable member and the second magnetic movable member apart to re-establish the air gap therebetween and to advance the second magnetic movable member;
an insulated rod connected to the first magnetic movable member and extending through a bore in the second magnetic movable member;
an output fork spaced from the second magnetic movable member and connected to a movable load, the rod slidably connected to the output fork;

bi-directional latch means, associated with and acting on the first and second magnetic movable members, for allowing selective movement of the first and second magnetic movable members in one direction, while blocking movement of the first and second magnetic movable members in an opposite direction; and latch control means for moving the bi-directional latch means from positions allowing movement of the first and second magnetic movable members in one direction to positions allowing movement of the first and second magnetic movable members only in a second, opposite direction.

15. The linear motor of claim 14 wherein the bi-directional latch means comprises:

first and second pairs of latches, each of the first and second pair of latches including first and second latch members, each of the first and second pairs of latches respectively associated with the first and second magnetic movable members;

each of the first and second pairs of latches having the first and second latch members thereof arranged in opposite orientation such that one of the first and second latch members of each of the first and second pairs of latches is disposed in a position to prevent movement of the associated magnetic movable member in one direction and to allow movement of the associated magnetic movable member in an opposite direction, while the other of the first and second latch members of each of the first and second pair of latches is disposed to allow movement of the associated first and second magnetic movable members in one direction, but prevents movement of the associated first and second magnetic movable members in an opposite direction.

16. A linear motor comprising:

a coil formed of a plurality of windings;

a magnetic core surrounding the coil;

a first magnetic movable member movably disposed within and extending partially outward from one end of the coil and the magnetic core;

a second magnetic movable member movably disposed within and extending partially outward from the other end of the coil and the magnetic core, the second magnetic movable member being co-axially aligned with the first magnetic movable member and normally spaced from one end of the first magnetic movable member by an air gap;

the magnetic core and the first and second magnetic movable members forming a magnetic flux path when current is supplied to the coil to urge the second magnetic movable member into contact with the first magnetic movable member to close the air gap therebetween;

a rotator body;

a guide rod connected to the second magnetic movable member and extending through the first magnetic movable member to the rotator body;

biasing means extending between one end of the first magnetic movable member and the rotator body;

a contact body rotatably mounted on the rotator body;

an electrical contact mounted in the contact body and electrically connected between an electrical power source and the magnetic coil to carry electric current to the coil; and means, mounted in the rotator body, for rotating the electrical contact during each operation of the linear motor.

* * * * *